Figure 8:
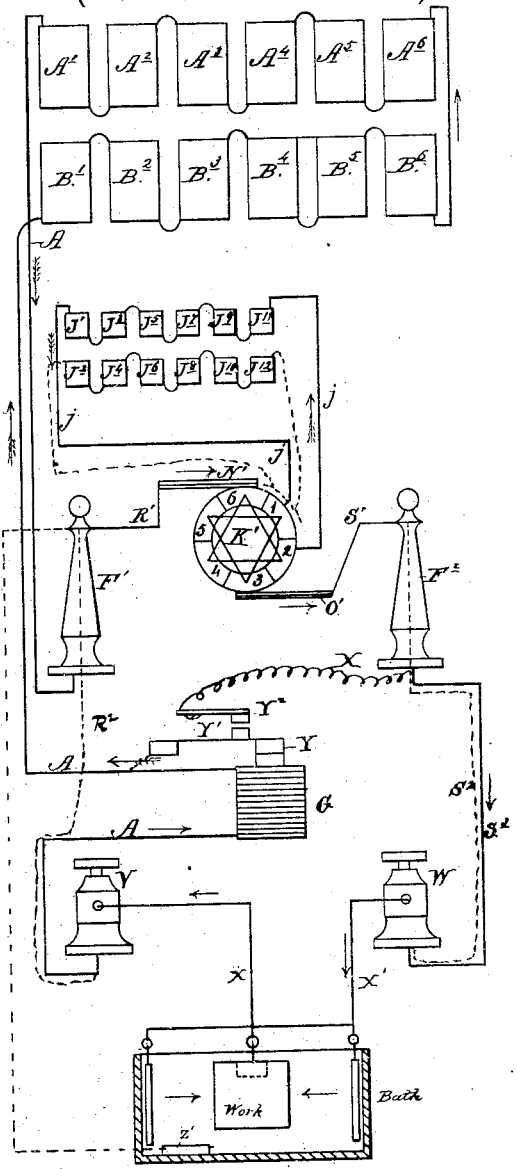

(No Model.) 5 Sheets—Sheet 1.
H. J. MÜLLER.
Dynamo Electric Machine.
No. 241,053. Patented May 3, 1881.
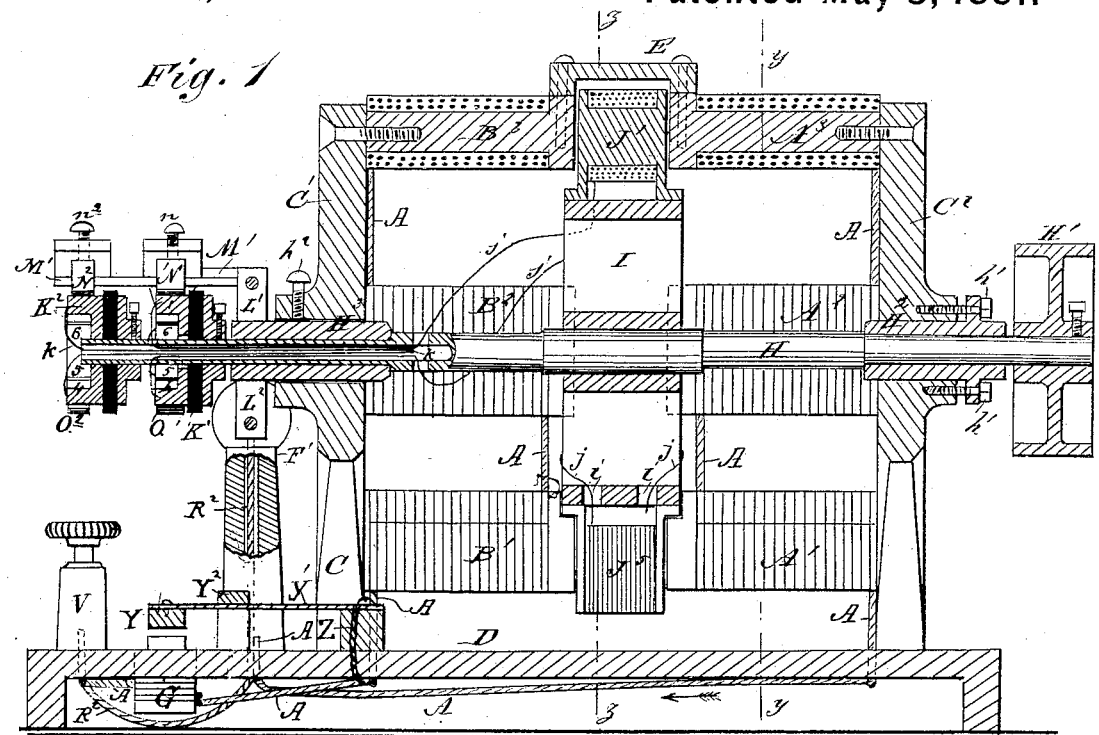
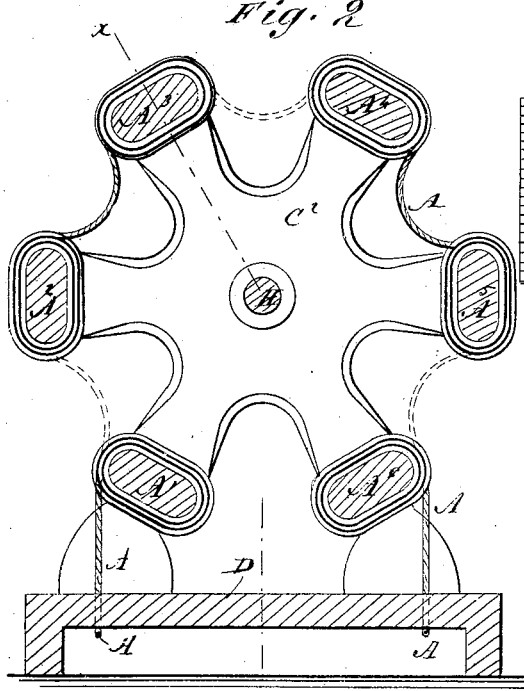
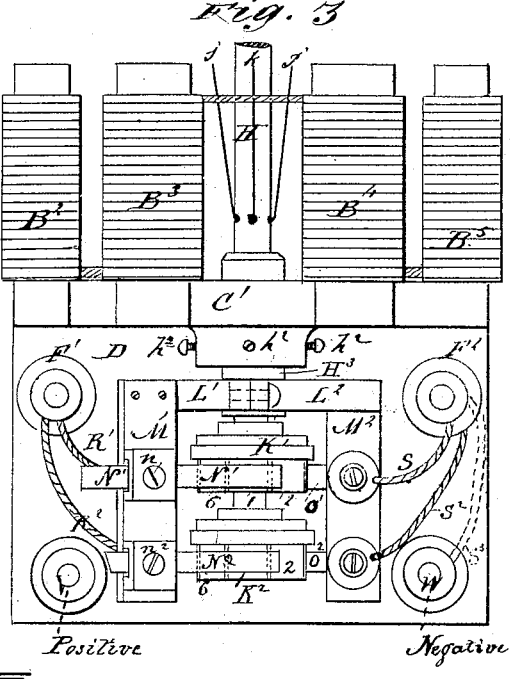
WITNESSES:
C. Neveux
C. Sedgwick
INVENTOR:
H. J. Müller
BY Munn & Co
ATTORNEYS.

(No Model.) 5 Sheets—Sheet 2.
H. J. MÜLLER.
Dynamo Electric Machine.
No. 241,053. Patented May 3, 1881.
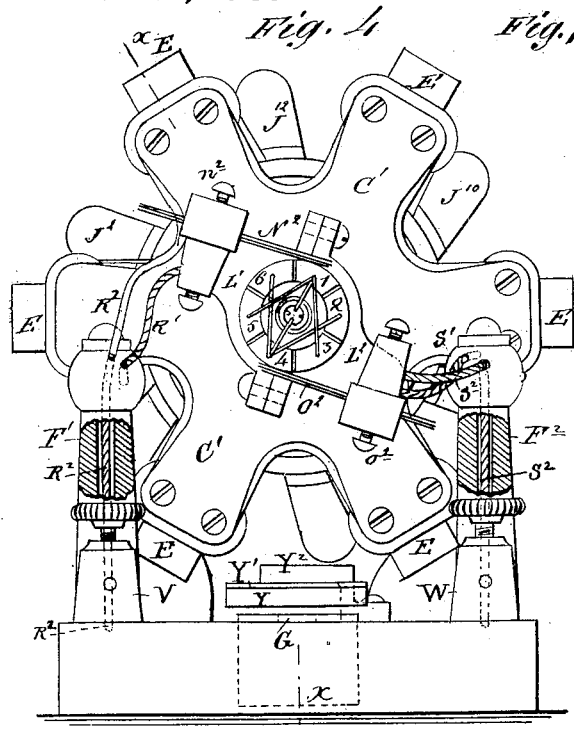
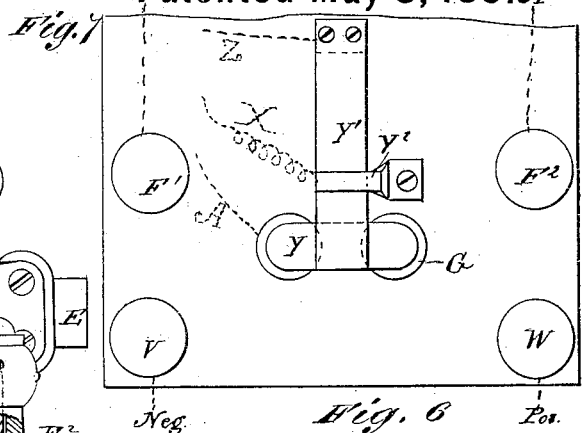
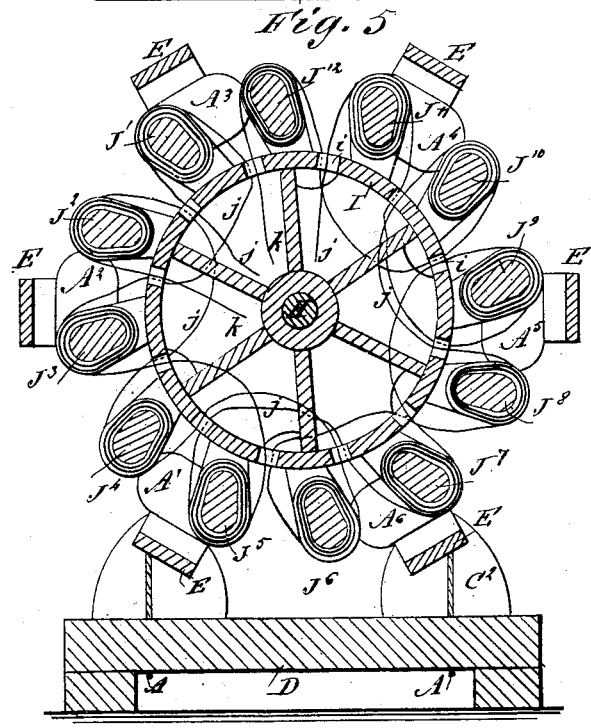
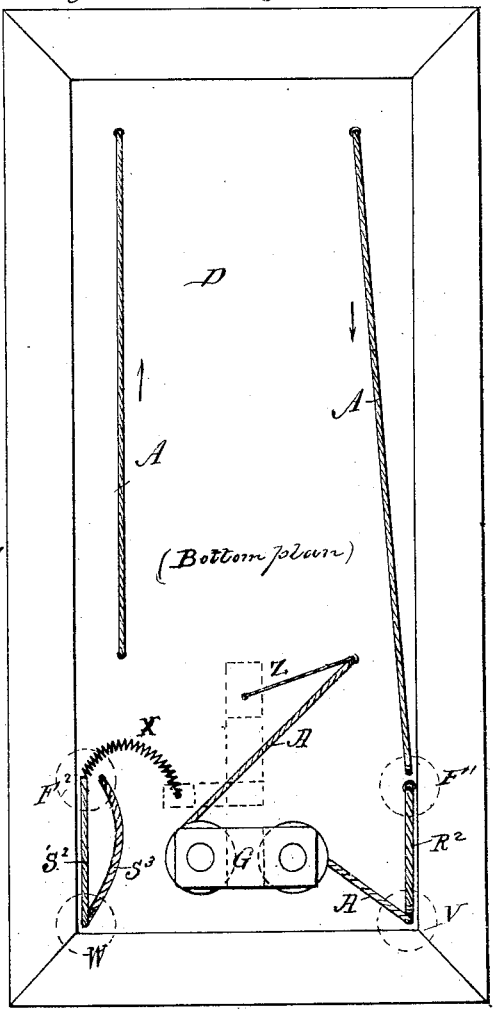
WITNESSES:
C. Neveux
C. Sedgwick
INVENTOR:
H. J. Müller
BY Munn & Co
ATTORNEYS.

(No Model.)  
5 Sheets—Sheet 3.

H. J. MÜLLER.
Dynamo Electric Machine.

No. 241,053.  
Patented May 3, 1881.

(First Primary Current.)

(Second Primary Current.)

WITNESSES:  
W. W. Hollingsworth  
C. Sedgwick

INVENTOR:  
H. J. Müller  
BY Munn & Co.  
ATTORNEYS.

(No Model.)  H. J. MÜLLER.  5 Sheets—Sheet 4.
Dynamo Electric Machine.
No. 241,053.  Patented May 3, 1881.
Fig. 10.
(Secondary current when large work is removed from bath.)
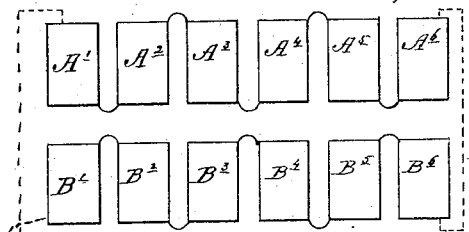
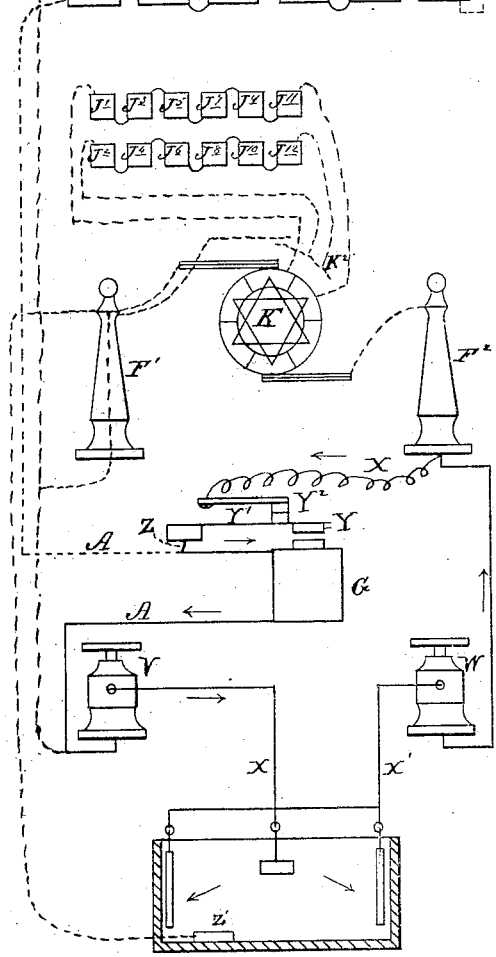
Fig. 11.
(Secondary current when no work is in bath.)
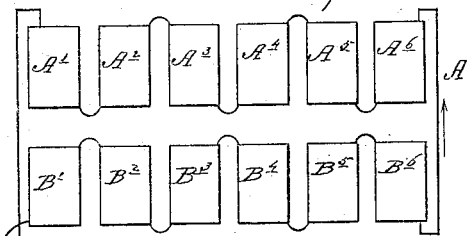
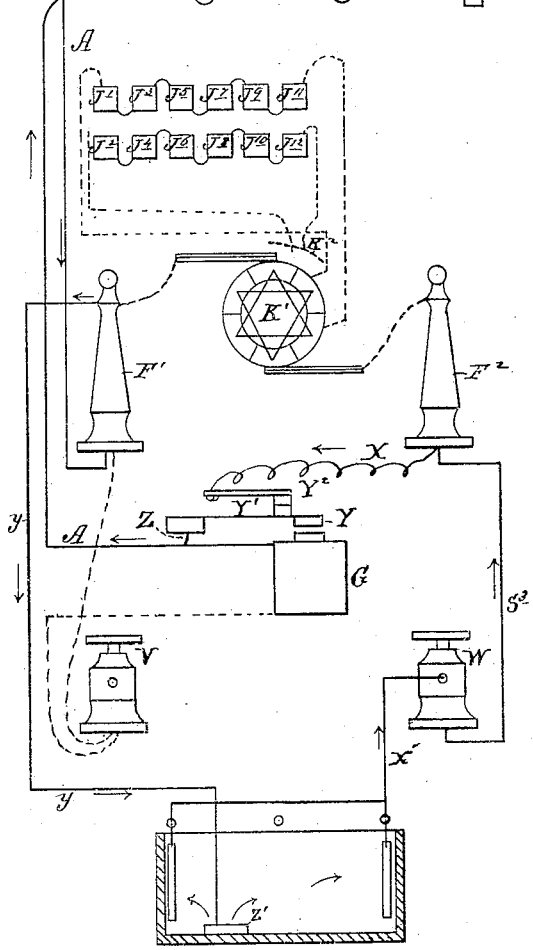
WITNESSES:
W. W. Hollingsworth
C. Sedgwick
INVENTOR:
H. J. Müller
BY
ATTORNEYS.

(No Model.) 5 Sheets—Sheet 5.
H. J. MÜLLER.
Dynamo Electric Machine.
No. 241,053. Patented May 3, 1881.
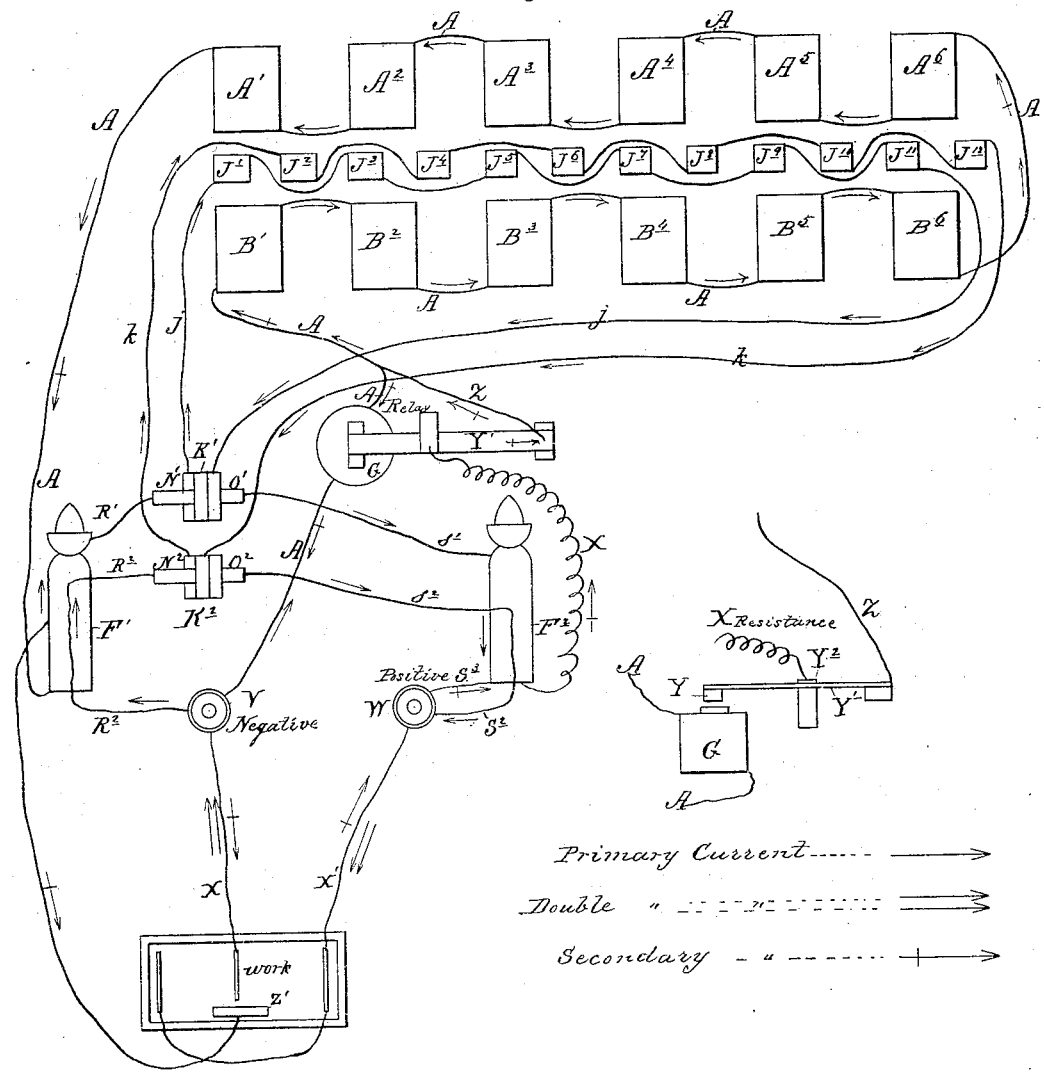
WITNESSES:
C. Sedgwick
W. W. Hollingsworth
INVENTOR:
H. J. Müller
BY Munn & Co
ATTORNEYS.

UNITED STATES PATENT OFFICE.

HANS J. MÜLLER, OF NEW YORK, N. Y., ASSIGNOR TO HIMSELF AND ALEXANDER LEVETT, OF SAME PLACE.

DYNAMO-ELECTRIC MACHINE.

SPECIFICATION forming part of Letters Patent No. 241,053, dated May 3, 1881.

Application filed November 9, 1880. (No model.)

*To all whom it may concern:*

Be it known that I, HANS J. MÜLLER, of the city, county, and State of New York, have invented a new and Improved Dynamo-Electric Machine; and I do hereby declare that the following is a full, clear, and exact description of the same.

The object of the invention is to provide an improved dynamo-electric machine which shall be adapted for use for various purposes, and particularly for electroplating and analogous arts.

The invention is an improvement in the class of such machines in which a series of armature-coils are attached to a shaft rotated by power suitably applied, so that they rotate between fixed and opposing field-magnets, and thereby generate the requisite current.

The invention consists in combining a relay and a resistance with a series of rotating armatures and fixed field-magnets, whereby the reverse or secondary current (originating in the bath of plating solution) is caused to pass through the magnets in the same direction as the main current, and which relay will regulate the permanent charge of the machine.

The invention further consists in providing the armature-wheel with broad flat spokes and with openings in the broad periphery, for the purpose of creating a strong air-current outward, and thereby preventing overheating of the armature-coils.

In the accompanying drawings, Figure 1 is a longitudinal sectional elevation on the line $x\,x$, Figs. 2 and 4. Fig. 2 is a vertical cross-sectional elevation on the line $y\,y$, Fig. 1. Fig. 3 is a top view of the forward end of the machine, showing the commutators. Fig. 4 is an elevation of the forward end of the machine.
Fig. 5 is a vertical cross-sectional elevation on the line $z\,z$, Fig. 1. Fig. 6 is a view of the under side of the base-plate of the machine, showing the arrangement of the connecting-wires. Fig. 7 is a plan view of the forward end of the base-plate of the machine, showing the arrangement of the relay binding screws and posts. Figs. 8 to 12, inclusive, are diagrams illustrating the several electrical circuits and connections.
The electro-magnets $A'$ to $A^6$ and $B'$ to $B^6$ are attached to the standards $C'$ and $C^2$, respectively, resting on the base D, and are connected by brass braces E E, which keep the magnets the proper distance apart and give the apparatus stiffness and rigidity. The electro-magnets are connected with each other in the following manner: The wire A, Fig. 1, passes from the metallic post $F'$, with which it is metallically connected, to the outer end of the magnet $A'$, from the inner end of $A'$ to the inner end of $A^2$, from the outer end of $A^2$ to outer end of $A^3$, and so on until it leaves the outer end of $A^6$; passes along the under side of the base-plate D to the outer end of $B^6$, from the inner end of $B^6$ passes to the inner end of $B^5$, and so on until it leaves the magnet $B'$ at the outer end and passes through the base-plate and is connected to a relay-magnet, G, from which it extends (Fig. 6) to binding-post V, to which the negative wire of the external circuit is attached.

Between the two opposite concentric series of magnets, $A'$ to $A^6$ and $B'$ to $B^6$, revolves an armature-wheel I, which is mounted on a horizontal shaft, H, whose journals have sleeve-like bearings $H^2$ and $H^3$. The latter are respectively adjustable horizontally and vertically by means of set-screws $h'$ and $h^2$, Figs. 1 and 3. By such adjustments the armature-wheel can be maintained in the proper position between the adjoining magnets, and any misplacement of the former can be easily rectified.

Rotary motion may be imparted to the shaft H by means of a band-pulley, $H'$, mounted on one of its projecting ends. On the other end of said shaft are mounted the commutators $K'$ and $K^2$, which revolve with it. Each commutator consists of six segments, properly insulated, and arranged concentrically within a flanged ring. As shown in Fig. 4, the segments 1 3 5 of each commutator are connected by wires, and also the segments 2 4 6 in a similar manner.

Brushes $N'$ and $O'$ are applied to commutator $K'$, and brushes $N^2$ and $O^2$ to the second commutator, $K^2$, in the usual way and for the usual purpose. These several brushes are secured adjustably, by means of clamp-screws $n\,o$ and $n^2\,o^2$, to a rigid frame consisting of parallel bars $M'\,M^2$ and bars $L'\,L^2$, that are fastened to the journal-bearing $H^3$, as shown in Figs. 1 and 3.

The armature-wheel I has twelve coils attached to its periphery, which are designated by letters $J'$ to $J^{12}$, inclusive. These coils are divided into groups of six each by the mode of connecting them—that is to say, a wire, $j$, connects every second coil, $J'$, $J^3$, $J^5$, &c., in one circuit, Fig. 5, while the other six, $J^2$, $J^4$, $J^6$, &c., are similarly connected by another wire, $k$. These wires pass through holes $i$ in the broad periphery of the wheel I, thus connecting the alternate coils, as shown in Fig. 5, then, through the hollow end of the shaft H, Fig. 1, to the respective commutators $K'$ and $K^2$—that is to say, the wire $j$ connects with segments 1 3 5 of commutator $K'$, and with coils $J'$ $J^3$ $J^5$ $J^7$ $J^9$ $J^{11}$, and the other wire, $k$, similarly connects the segments 2 4 6 of commutator $K^2$ with the remaining coils $J^2$ $J^4$ $J^6$ $J^8$ $J^{10}$ $J^{12}$. (See Figs. 8 and 9.) The radial spokes of the armature-wheel I are made very broad, and when the wheel is rotated they operate as so many fans or fan-blades, forcing the air outward from the axis of the wheel and driving it in strong currents through the holes $i$ and against and between the several coils $J'$ to $J^{12}$, thereby preventing overheating of the latter.

In many machines of this class water-currents are employed to cool the armature-coils, and attempts have been made to attain the same result by providing for circulation of air around and between the coils, but, so far as I have been able to learn, without the expected success. In my invention, by means of the broad spokes conjoined with the perforated periphery of the wheel, a rapid circulation or so forcible currents are produced that the desired reduced temperature of the coils is effectually maintained. For the purpose of running machines of this kind economically this construction of the armature-wheel is very important.

Figure 9:
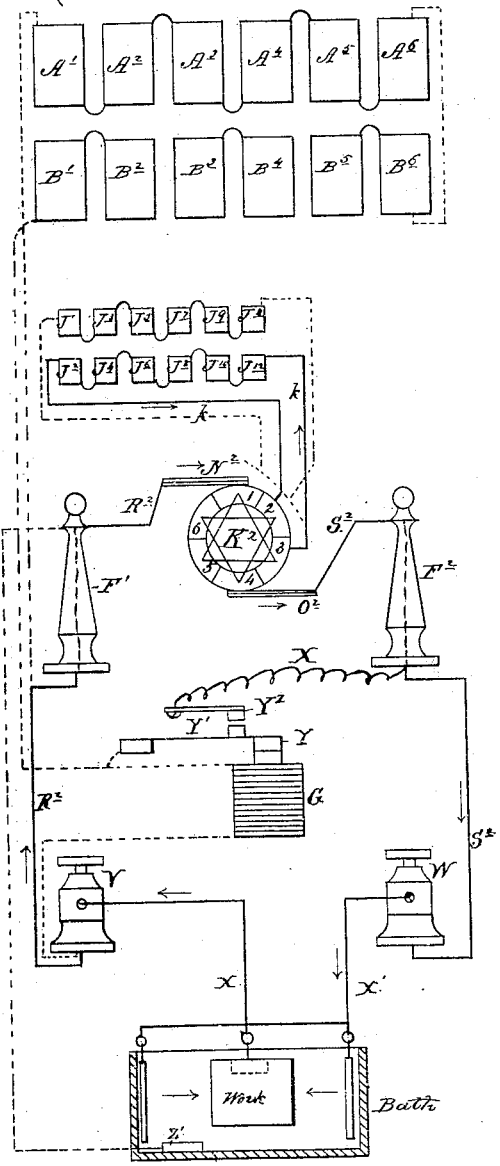

I have heretofore stated that the two series of magnets $A'$, &c., $B'$, &c., are connected by means of a wire, A, with binding-post V, which is the point where the wire X, Figs. 8, 9, is attached that connects the negative current to the electroplating-bath. The contiguous binding-post W is the one from which the positive connection is made with the bath by means of wire $X'$, Figs. 8, 9, and I will now indicate the means for connecting it with the parts that complete the circuit in the machine. The wire A connects metallically with the metal post $F'$, and the wire $R'$, Figs. 3 and 8, connects the latter with brush $N'$ of commutator $K'$, while wire $S'$ extends from the corresponding or opposite brush, $O'$, to the post $F^2$, and the wire $S^3$ connects the latter with binding-post W. From the latter a wire, $S^2$, passes through post $F^2$ to the brush $O^2$ of the second commutator, $K^2$, the same being insulated in the post, as shown in Fig. 4. From the corresponding brush $N^2$ of the second commutator, $K^2$, a wire, $R^2$, passes through and is insulated in post $F'$, and thence to binding-post V.

Referring to Figs. 1, 4, and 8, Y is the armature of the relay-magnet G, and $Y'$ a spring, to whose free end it is attached.

$Y^2$ is a contact-bracket, and X a resistance-coil connecting it with the post $F^2$ on the under side of the base-plate D.

Z is a short wire that connects the spring $Y'$ with wire A, for a purpose hereinafter specified.

Although six electro-magnets are described as forming each group, any number, from three upward, may be employed. The armature-coils are divided into two groups, but any number of groups may be employed, so long as each group is provided with a commutator, and the number of coils in each group must correspond with the number of field-magnets in a series. When power is applied to the machine through the medium of a belt (not shown) running on the pulley $H'$ of the shaft H the electro-motive force is generated, and two currents are produced and led off from the armature. The current from either group may be used to excite the field-magnets $A'$ to $A^6$ and $B'$ to $B^6$, and also to do work in the external circuit, or one group may be used to excite such magnets and the others to do work, such as electroplating.

For sake of convenience the current generated in the armature-coils $J'$, $J^3$, &c., may be designated as the first primary, and the current generated in the other group of armature-coils, $J^2$, $J^4$, &c., as the second primary. The circuit of the first primary current, Fig. 8, is as follows: It is generated in the coils $J'$, $J^3$, &c., of the armature-wheel I, and, as indicated by arrows, is through the wire $j$, segments 1 3 5 of commutator $K'$, the brush $O'$, wire $S'$, post $F^2$, wire $S^3$, binding-post W, and thence, by wire $X'$, to the anodes in the bath of electroplating solution. From the work therein the now negative current returns through wire X, binding-post V, and wire A, to magnet G; thence, through magnets $B'$ to $B^6$ and $A'$ to $A^6$ to post $F'$, wire $R'$, and brush $N'$ to segments 6 4 2 of commutator $K'$, and by wire $j$ back to armature-coils $J^{11}$, $J^9$, $J^7$, &c. The circuit of the second primary current, Fig. 9, from the remaining six coils of the armature—to wit, $J^2$, $J^4$, $J^6$, &c.—is through wire $k$, segments 2 4 6 of commutator $K^2$, brush $O^2$, wire $S^2$, and binding-post W, wire $X'$ to the anodes, and then to the work in the bath. From the work the now negative current proceeds, by wire X, through binding-post V, wire $R^2$, brush $N^2$, segments 1 5 3 of commutator $K^2$, and wire $k$, back to armature-coils $J^{12}$, $J^{10}$, &c. Thus the first primary current both excites the electro-magnets and performs work in the external circuit, while the second primary current performs work only. Thus far—that is to say, when large work, Figs. 8, 9, is in the bath—the resistance-coil X and magnet G have no function, but they come into action whenever all the work is removed, or whenever the large work is removed and only a small piece is left in the bath, because in such case a reverse or secondary current is generated in the bath of cyanide solution, and it must be short-circuited, or made to take the same course as the primary current, in order to prevent change of polarization of the magnets and to prevent a full charge in the machine—in other words, the relay-magnet G serves to regulate the permanent charge in the machine at all times, for the relay and resistance conduct the secondary current in the direction of the main current and compel it to take a short circuit, as I will proceed to explain.

If the large work be removed and only small work left in the bath, as shown in Fig. 10, the secondary current that instantly arises passes from the anodes along wire X' to binding-post W, thence by wire $S^3$ to resistance-coil X into contact-bracket $Y^2$, and thus into spring Y', which at that moment rests against it, owing to the connection in the bath having been broken. From spring Y' the current passes by wire Z to wire A, thus through magnet G, and to binding-post V, and thus back to the work in the bath, which completes the circuit. In such case—that is to say, when the reverse or secondary current is passing, as just described—the primary current, which carries on the process of electro-deposition in the bath, is divided at the junction of coil X and wire $S^3$, so that about two-thirds of the former current takes the usual course to the anode, via post W and wire X', and the remaining one-third passes through resistance-coil X and along wire A, through the field-magnets, &c. The secondary current takes the short circuit described because there is less resistance than in the commutators and armature, &c.

In Fig. 11 I have shown the course of the reverse or secondary current when all the work has been removed from the bath. It will be noted that there is then no connection through the wire X that leads from the bath to binding-post V. Hence the secondary current must complete its circuit by passing from the relay-magnet G through wire A, the field-magnets B' and A' and post F', and thence, by means of a separate line, y, to the bath. This separate line is thus indispensable for completion of a circuit through the bath when there is no work left in the latter; but the circuit could not be properly completed in the manner required by means of such wire alone, for the resistance to passage of the current through the bath must not be lessened so much as to greatly increase the charge of the machine—that is to say, by allowing field-magnets and armature-coils to strongly attract each other, and thereby cause a waste of power in rotating the armature-wheel, whose resistance to rotation then becomes very great. I have found that a carbon plate, Z', attached to the wire y, and placed in the bath, Figs. 8 to 12, inclusive, affords the desired degree of resistance—neither too much nor too little—and thus serves as a perfect protector, not only against a too-full charge, but also prevents the strong reverse current that might produce reversal of the polarity of the magnets.

In further explanation, and partly by way of recapitulation of the operation and effect of the currents, I will state that when the article in the bath is small the primary current is too weak to excite the magnet G sufficiently to cause it to attract the armature $Y^2$ with force enough to overcome the resistance of spring Y', and thus draw down the armature $Y^2$. The secondary current will continue to pass as indicated in Figs. 10 and 11; but whenever the amount of surface of the work in the bath is sufficient to allow a strong primary current the magnet G attracts the armature $Y^2$, and thus breaks the short circuit through resistance-coil X. Thus when the bath is full of work the secondary current is, so to speak, forced back by the primary current, and cannot assert itself until the primary current has become weakened, which, as already indicated, may occur through removal of a portion or all of the work in the bath.

In Fig. 12 I have indicated, by a diagram, the circuits of all the currents—the primary by plain arrows, and where they have the same path by pairs of arrows. The secondary or reverse current that is generated in the bath, as before described, when all the work is removed, or even when a large amount of work is removed, is indicated by a crossed arrow.

The inclination of the armature-coils, and certain other features of this machine, I propose to make the subject of other patents, and hence in this case I restrict myself to claiming two features.

I claim—

1. In a dynamo-electric machine, the combination of the negative wire with a relay and a resistance, substantially as shown and described, for the purpose of conducting the secondary current through the field-magnets in the same direction as the main current, and to regulate the permanent charge of the machine.

2. In a dynamo-electric machine, the rotating armature-wheel, having open sides and a series of broad spokes arranged radially and severally parallel to its axis, and the broad periphery, having openings $i$ $i$ between each two spokes and between each two coils, all as shown and described, to operate as and for the purpose specified.

HANS J. MÜLLER.

Witnesses:
 OSCAR F. GUNZ,
 C. SEDGWICK.